(12) United States Patent
Hong et al.

(10) Patent No.: US 8,809,717 B2
(45) Date of Patent: Aug. 19, 2014

(54) TOUCH PANEL

(75) Inventors: Won-Ki Hong, Suwon-si (KR); Seung Ho Nam, Seongnam-si (KR); Chul Kim, Hwaseong-si (KR); Hyun-Ju Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 84 days.

(21) Appl. No.: 13/570,141

(22) Filed: Aug. 8, 2012

(65) Prior Publication Data

US 2013/0206567 A1    Aug. 15, 2013

(30) Foreign Application Priority Data

Feb. 14, 2012 (KR) .................. 10-2012-0015052

(51) Int. Cl.
*H03K 17/975* (2006.01)

(52) U.S. Cl.
USPC .......................................................... 200/600

(58) Field of Classification Search
USPC .......... 200/600, 46, 5 R, 5 A, 292, 511, 512; 345/173, 174, 177, 178
See application file for complete search history.

(56) References Cited

U.S. PATENT DOCUMENTS

| | | | |
|---|---|---|---|
| 5,565,658 A | | 10/1996 | Gerpheide et al. |
| 6,297,811 B1 | | 10/2001 | Kent et al. |
| 7,864,503 B2 | | 1/2011 | Chang |
| 7,920,129 B2 | | 4/2011 | Hotelling et al. |
| 8,040,321 B2 | * | 10/2011 | Peng et al. ............. 345/169 |
| 2010/0001972 A1 | * | 1/2010 | Jiang et al. ............. 345/173 |
| 2010/0149108 A1 | | 6/2010 | Hotelling et al. |
| 2010/0164889 A1 | * | 7/2010 | Hristov et al. ............. 345/173 |
| 2010/0182273 A1 | | 7/2010 | Noguchi et al. |
| 2010/0320009 A1 | | 12/2010 | Kuo et al. |
| 2011/0069035 A1 | * | 3/2011 | Chen et al. ............. 345/174 |
| 2011/0141055 A1 | * | 6/2011 | Hsu ....................... 345/174 |

FOREIGN PATENT DOCUMENTS

| | | |
|---|---|---|
| EP | 2330491 A2 | 6/2011 |
| JP | 2009-271923 A | 11/2009 |
| JP | 2010-108505 A | 5/2010 |
| JP | 4506785 | 5/2010 |
| JP | 2010-277152 A | 12/2010 |
| KR | 1020090011244 A | 2/2009 |
| KR | 100915655 | 8/2009 |
| KR | 1020090098947 A | 9/2009 |
| KR | 1020090104192 A | 10/2009 |
| KR | 1020100011901 A | 2/2010 |
| KR | 100978461 | 8/2010 |
| KR | 1020110049512 A | 5/2011 |
| KR | 1020110057501 A | 6/2011 |

* cited by examiner

*Primary Examiner* — Edwin A. Leon
*Assistant Examiner* — Anthony R. Jimenez
(74) *Attorney, Agent, or Firm* — Innovation Counsel LLP

(57) ABSTRACT

A touch panel is provided that includes: a substrate; a plurality of X-axis lines disposed on the substrate; a plurality of Y-axis lines crossing the plurality of X-axis lines; and an insulating layer interposed between the X-axis lines and the Y-axis lines, in which at least one first X-axis line and at least one second X-axis line selected from among the plurality of X-axis lines are connected by a first connection portion, and among the plurality of Y-axis lines, a Y-axis line crossing the first X-axis line and the second X-axis line has a first area in a region where the Y-axis line overlaps the first X-axis line and a second area in a region where the Y-axis line overlaps the second X-axis line, and the first area and the second area are different from each other.

26 Claims, 19 Drawing Sheets

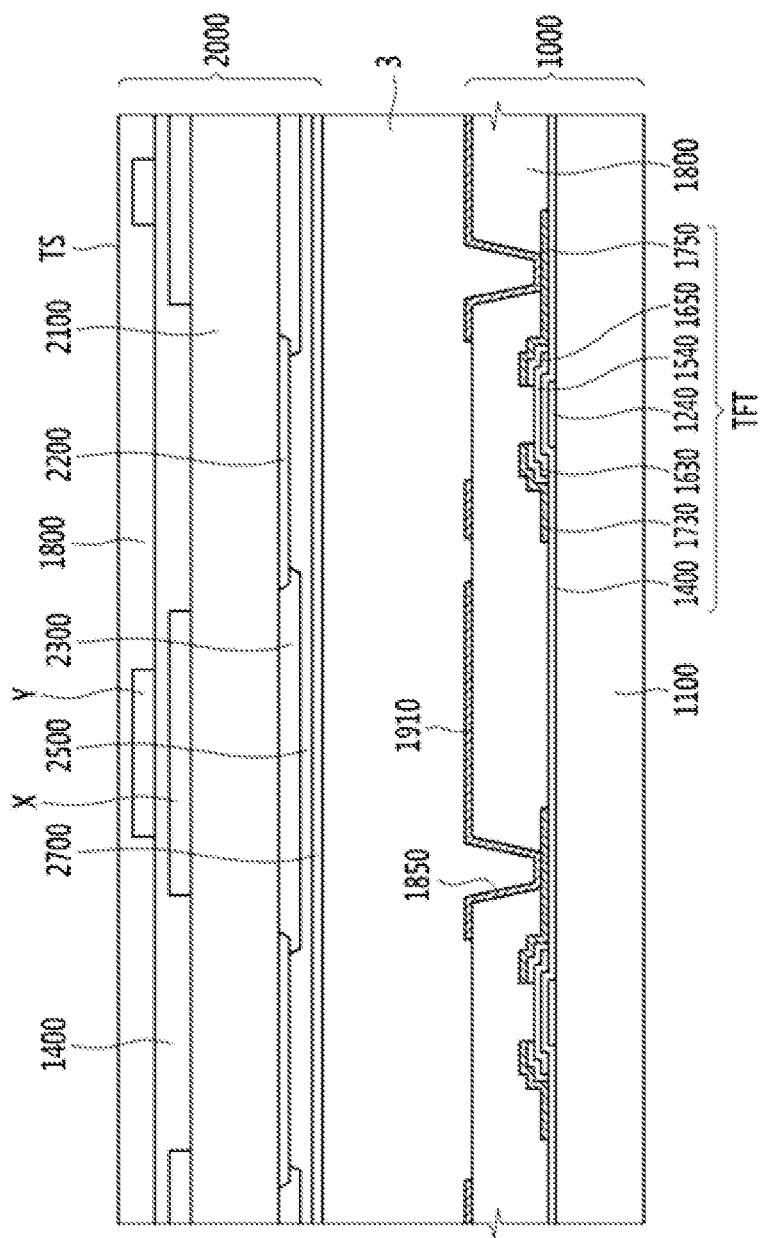

TOUCH PANEL

CROSS-REFERENCE TO RELATED APPLICATION

This application claims priority to and the benefit of Korean Patent Application No. 10-2012-0015052 filed in the Korean Intellectual Property Office on Feb. 14, 2012, the entire contents of which are incorporated herein by reference.

BACKGROUND OF THE INVENTION (a) Field of the Invention

The present invention relates to a touch panel.

(b) Description of the Related Art

In general, a touch panel is an input device that anyone can easily use by touching a part of the touch panel with a finger to operate a computer or the like conversationally and intuitively. A device where the touch panel is integrated with a display corresponds to a touch screen. The touch screen is an input device that performs input by touching the screen, for instance on an image of a button displayed on the screen, with a finger.

For the touch panel, a resistive type, a capacitive type, an infrared type, an ultrasonic type, and the like according to a touch sensing method are used. Currently, the resistive type is used much, but in the future, the use of the capacitive type, which is advantageous in terms of durability and also that it can be used to make devices lighter, thinner, shorter and smaller.

In the capacitive type touch panel, the touch screen has a structure in which, on a transparent insulator film such as PET or glass, an X-axis electrostatic electrode and a Y-axis electrostatic electrode and a pad are disposed. The X-axis electrostatic electrode and Y-axis electrostatic electrodes are made of a light transmitting conductor and are disposed by adding an adhesive layer or an insulator layer such that the X-axis electrostatic electrode and the Y-axis electrostatic electrode are laminated vertically or arranged on the same plane to be adjacent to each other. The pad constitutes a lead wire, such as silver paste, on edges of the electrostatic electrodes.

In the touch screen formed as above, a controller receives a touch signal according to a user's touch and outputs a coordinate signal.

However, because a plurality of electrostatic electrodes are arranged in a matrix form in row and column directions and lead electrode wires transferring signals to the plurality of electrostatic electrodes are connected to the electrostatic electrodes one by one, bezel is saturated and touch resolution are decreased, thus reducing touch sensitivity.

The above information disclosed in this Background section is only for enhancement of understanding of the background of the disclosure and therefore it may contain information that does not form the prior art that is already known to a person of ordinary skill in the art.

SUMMARY OF THE INVENTION

A touch panel is provided that reduces the size of a bezel while maintaining the same resolution.

A touch panel includes: a substrate; a plurality of X-axis lines disposed on the substrate, a plurality of Y-axis lines crossing the plurality of X-axis lines and an insulating layer interposed between the X-axis lines and the Y-axis lines, wherein at least one first X-axis line and at least one second X-axis line selected from among the plurality of X-axis lines are connected by a first connection portion, among the plurality of Y-axis lines, a Y-axis line crossing the first X-axis line and the second X-axis line has a first area in a region where the Y-axis line overlaps the first X-axis line and a second area in a region where the Y-axis line overlaps the second X-axis line. The first area and the second area are different from each other.

At least one first Y-axis line and at least one second Y-axis line selected from among the plurality of Y-axis lines may be connected by a second connection portion, and among the plurality of X-axis lines, an X-axis line crossing the first Y-axis line and the second Y-axis line may have a third area in a region where the X-axis line overlaps the first Y-axis line and a fourth area in a region where the X-axis line overlaps the second Y-axis line. The third area and the fourth area may be different from each other.

The first area, the second area, the third area, and the fourth area may be different from one another.

The plurality of X-axis lines may include a third X-axis line disposed between the first X-axis line and the second X-axis line, and a fourth X-axis line with the second X-axis line disposed between the third X-axis line and the fourth X-axis line. The third X-axis line and the fourth X-axis line may be connected by a third connection portion.

The first connection portion and the third connection portion may be positioned at left and right sides, respectively, of the touch panel when the touch panel is viewed from a top plan view.

The X-axis line may be a sensing electrode and the Y-axis line may be a driving electrode.

The first X-axis line and the second X-axis line may have the same width and extend in the same direction.

The plurality of X-axis lines, the insulating layer, and the plurality of Y-axis lines may be sequentially laminated, and the touch panel may further include a passivation layer disposed on the plurality of Y-axis lines.

The touch panel may further include a color filter disposed on the substrate, in which the color filter, the plurality of X-axis lines, and the plurality of Y-axis lines may be disposed at a same plane as the substrate.

The plurality of X-axis lines may comprise a transparent conductive material.

The plurality of Y-axis lines may comprise a transparent conductive material.

In another aspect, a touch panel is provided that includes: a substrate; a plurality of X-axis lines disposed on the substrate; a plurality of Y-axis lines crossing the plurality of X-axis lines; and an insulating layer interposed between the X-axis lines and the Y-axis lines, in which at least one first X-axis line and at least one second X-axis line selected from among the plurality of X-axis lines are connected by a first connection portion, and the plurality of Y-axis lines include a crossing Y-axis line crossing the first X-axis line and the second X-axis line. The insulating layer includes a first region having a first thickness in a region where the first X-axis line overlaps the crossing Y-axis line, and a second region having a second thickness in a region where the second X-axis line overlaps the crossing Y-axis line, and the first thickness and the second thickness are different from each other.

At least one first Y-axis line and at least one second Y-axis line selected from among the plurality of Y-axis lines may be connected by a second connection portion, the plurality of X-axis lines may include a crossing X-axis line crossing the first Y-axis line and the second Y-axis line, the insulating layer may have a third region having a third thickness in a region where the first Y-axis line overlaps the crossing X-axis line and a fourth region having a fourth thickness in a region where the second Y-axis line overlaps the crossing X-axis line. The third thickness and the fourth thickness may be different from each other.

The first thickness, the second thickness, the third thickness, and the fourth thickness may be different from one another.

The plurality of X-axis lines may include a third X-axis line disposed between the first X-axis line and the second X-axis line and a fourth X-axis line with the second X-axis line disposed between the third X-axis line and the fourth X-axis line. The third X-axis line and the fourth X-axis line may be connected by a third connection portion.

The first connection portion and the third connection portion may be positioned at left and right sides, respectively, of the touch panel when the touch panel is viewed from the top plan view.

The X-axis line may be a sensing electrode and the Y-axis line may be a driving electrode.

The first X-axis line and the second X-axis line may have the same width and extend in the same direction.

The plurality of X-axis lines, the insulating layer, and the plurality of Y-axis lines may be sequentially laminated, and the touch panel may further include a passivation layer disposed on the plurality of Y-axis lines.

In yet another aspect, a touch panel includes: a substrate; a plurality of X-axis lines disposed on the substrate; a plurality of Y-axis lines crossing the plurality of X-axis lines; and a first connection portion connecting at least one first X-axis line and at least one second X-axis line selected from among the plurality of X-axis lines, in which the X-axis line includes a plurality of X-axis electrode portions and the Y-axis line includes a plurality of Y-axis electrode portions, among the plurality of Y-axis lines, and a Y-axis line crossing the first X-axis line and the second X-axis line includes a first Y-axis electrode portion adjacent to a first X-axis electrode portion of the first X-axis line in a first direction and a second Y-axis electrode portion adjacent to a second X-axis electrode portion of the second X-axis line in the first direction. An area of a space between the first X-axis electrode portion and the first Y-axis electrode portion is different from an area of a space between the second X-axis electrode portion and the second Y-axis electrode portion.

The touch panel may further include a second connection portion connecting at least one first Y-axis line and at least one second Y-axis line selected from among the plurality of Y-axis lines, in which among the plurality of X-axis lines, an X-axis line crossing the first Y-axis line and the second Y-axis line may include a third X-axis electrode portion adjacent to a third Y-axis electrode portion of the first Y-axis line in a second direction and a fourth X-axis electrode portion adjacent to a fourth Y-axis electrode portion of the second Y-axis line in the second direction. An area of a space between the third X-axis electrode portion and the third Y-axis electrode portion may be different from an area of a space between the fourth X-axis electrode portion and the fourth Y-axis electrode portion.

The plurality of X-axis lines may include a third X-axis line disposed between the first X-axis line and the second X-axis line and a fourth X-axis line with the second X-axis line disposed between the third X-axis line and the fourth X-axis line, and the third X-axis line and the fourth X-axis line may be connected by a third connection portion.

At least one Y-axis line selected from among the plurality of Y-axis lines may be disposed between the first Y-axis line and the second Y-axis line.

The plurality of X-axis lines and the plurality of Y-axis lines may be arranged at a same plane.

A shape of each of the plurality of X-axis electrode portions and each of the plurality of Y-axis electrode portions may be a rhombus.

The touch panel may further include a passivation layer disposed on the plurality of X-axis lines and the plurality of Y-axis lines.

Accordingly, it is possible to reduce the number of lead wires by connecting the plurality of electrode lines with connection portions, thereby reducing the size of a bezel while maintaining the same resolution. In this connection, it is possible to identify regions positioned at the same node by changing a width of a conductive layer constituting a touch sensor or changing a thickness of an insulating layer between conductive layers.

BRIEF DESCRIPTION OF THE DRAWINGS

FIG. 19 shows a liquid crystal display including a touch panel according to an exemplary embodiment.

DETAILED DESCRIPTION OF THE EMBODIMENTS

Figure 1:
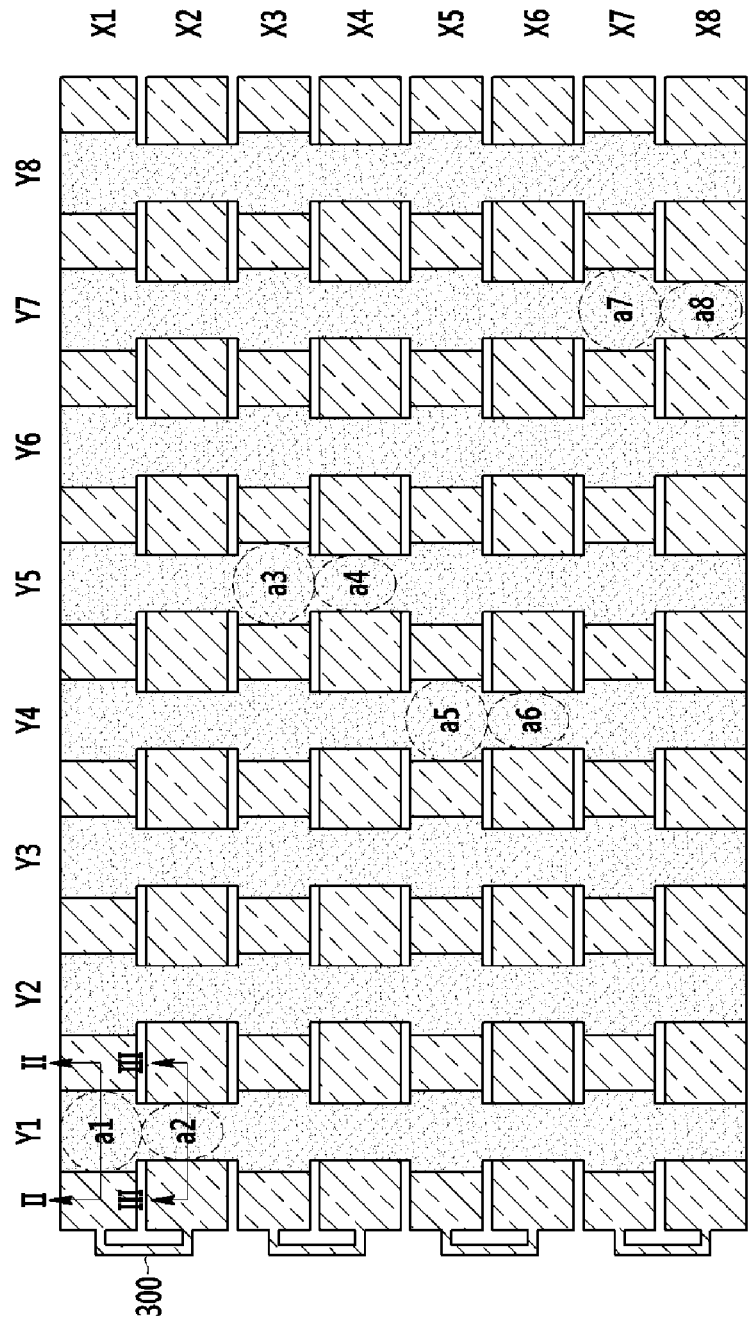
FIG. 1 is a top plan view of a touch panel according to an exemplary embodiment.

Hereinafter, exemplary embodiments will be described in detail with reference to the accompanying drawings. As those skilled in the art would realize, the described embodiments may be modified in various different ways, all without departing from the spirit or scope of the present invention. On the contrary, exemplary embodiments introduced herein are provided to make disclosed contents thorough and sufficiently transfer the spirit of the present invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening layers may also be present. Like reference numerals designate like elements throughout the specification.

Figure 2:
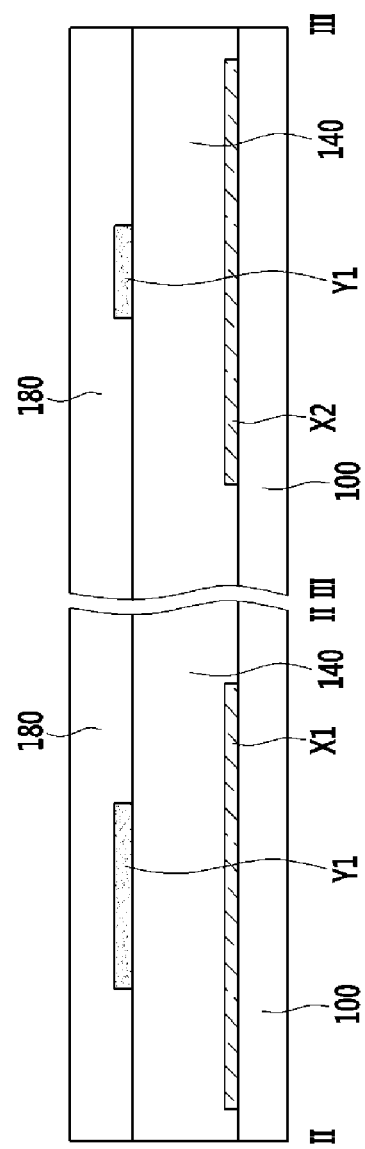
FIG. 2 is a cross-sectional view taken along lines II-II and III-III of FIG. 1.

FIG. 1 is a top plan view of a touch panel according to an exemplary embodiment. FIG. 2 is a cross-sectional view taken along lines II-II and III-III of FIG. 1.

Referring to FIGS. 1 and 2, a plurality of X-axis lines X1, X2, X3, X4, X5, X6, X7, and X8 extending in a horizontal direction are arranged to be spaced apart from one another. In this case, a first X-axis line X1 and a second X-axis line X2, a third X-axis line X3 and a fourth X-axis line X4, a fifth X-axis line X5 and a sixth X-axis line X6, and a seventh X-axis line X7 and an eighth X-axis line X8 selected from among the plurality of X-axis lines X1, X2, X3, X4, X5, X6, X7, and X8 are connected by a connection portion 300, respectively. The plurality of X-axis lines X1, X2, X3, X4, X5, X6, X7, and X8 may have the same width.

A plurality of Y-axis lines Y1, Y2, Y3, Y4, Y5, Y6, Y7, and Y8 cross the plurality of X-axis lines X1, X2, X3, X4, X5, X6, X7, and X8 and extend in a vertical direction. The plurality of Y-axis lines Y1, Y2, Y3, Y4, Y5, Y6, Y7, and Y8 are arranged to be spaced apart from one another.

The plurality of X-axis lines X1, X2, X3, X4, X5, X6, X7, and X8 and the plurality of Y-axis lines Y1, Y2, Y3, Y4, Y5, Y6, Y7, and Y8 may be made of a transparent conductive material.

The plurality of X-axis lines X1, X2, X3, X4, X5, X6, X7, and X8 are disposed on a substrate 100, an insulating layer 140 is disposed on the plurality of X-axis lines X1, X2, X3, X4, X5, X6, X7, and X8, the plurality of Y-axis lines Y1, Y2, Y3, Y4, Y5, Y6, Y7, and Y8 are disposed on the insulating layer 140, and a passivation layer 180 is disposed on the plurality of Y-axis lines Y1, Y2, Y3, Y4, Y5, Y6, Y7, and Y8.

Because the first X-axis line X1 and the second X-axis line X2, the third X-axis line X3 and the fourth X-axis line X4, the fifth X-axis line X5 and the sixth X-axis line X6, the seventh X-axis line X7 and the eighth X-axis line X8 are connected, respectively, by the connection portion 300, a pair of X-axis lines connected by the connection portion 300 transmits a sensing signal to a controller (not shown) via a bezel through a single lead wire (not shown). In the present exemplary embodiment, a first region a1 and a second region a2 are designed to have different areas so as to identify touch locations in the first region a1 versus the second region a2.

Specifically, an area of the first region a1 where the first Y-axis line Y1 overlaps the first X-axis line X1 is larger than an area of the second region a2 where the first Y-axis line Y1 overlaps the second X-axis line X2.

Hereinafter, how to identify whether the location of a touch is in the first region a1 or the second region a2, which are actually the same node, will be described with reference to FIGS. 3 to 5.

Figure 3:
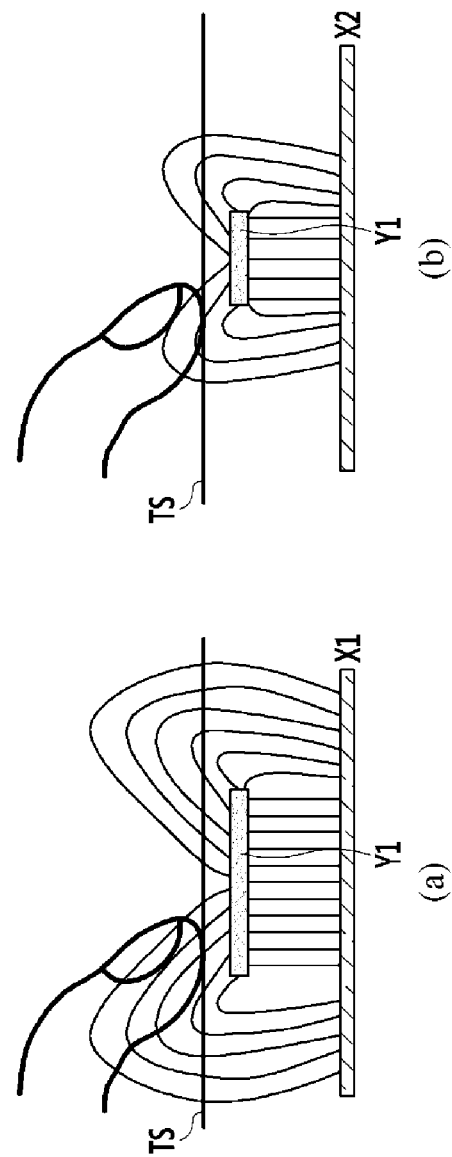
FIG. 3 is a cross-sectional view showing electric fields of parts taken along lines II-II and III-III of FIG. 1 when touch input occurs.

FIG. 3 is a cross-sectional view, taken along lines II-II and III-III of FIG. 1, showing electric fields that are generated when touch input occurs. Each of a plurality of a pair of X-axis lines (ex. the first X-axis line X1 and the second X-axis line X2) connected by the connection portion 300 may be connected to a power source through a single lead wire (not shown). Each of the plurality of Y-axis lines Y1, Y2, Y3, Y4, Y5, Y6, Y7, and Y8 may be connected to a power source at the end of the Y-axis lines. Voltages are applied to the pair of X-axis lines and the Y-axis lines by the power source, thus in operation, a capacitance is formed between the X-axis line and the Y-axis line overlapping the X-axis line.

FIG. 3(A) shows an electric field in the first region a1 of FIG. 1 and FIG. 3(B) shows an electric field in the second region a2 of FIG. 1. When touch input is applied to a touch surface TS (i.e., when the touch surface TS is touched with, for instance, a fingertip) in the first region a1 of FIG. 1, a fringe field is formed between the first Y-axis line Y1 and the finger, and thus capacitance formed between the first X-axis line X1 and the first Y-axis line Y1 is discharged. Likewise, when touch input is applied to a touch surface TS in the second region a2 of FIG. 1, a fringe field is formed between the first Y-axis line Y1 and the finger, and thus capacitance formed between the second X-axis line X2 and the first Y-axis line Y1 is discharged.

The insulating layer 140 is formed between the first X-axis line X1 and the first Y-axis line Y1 and also between the second X-axis line X2 and the first Y-axis line Y1. The passivation layer 180 is formed between the first Y-axis line Y1 and the touch surface TS.

In comparing FIG. 3(A) and FIG. 3(B), because the area of the first Y-axis line Y1 overlapping the first X-axis line X1 is larger than the area of the first Y-axis line Y1 overlapping the second X-axis line X2, more capacitance is discharged in the first region a1 as compared to the second region a2.

Figure 4:
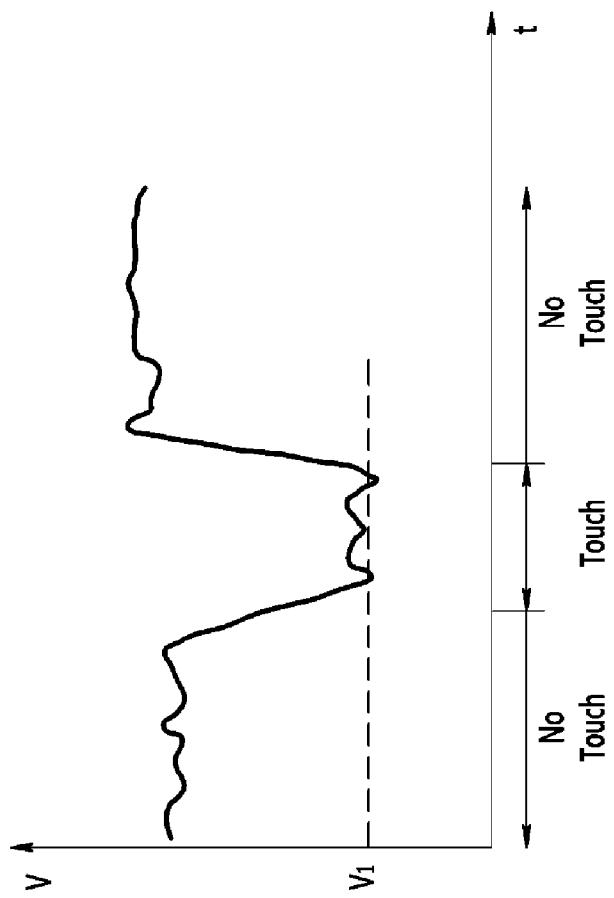
FIG. 4 is a graph showing a change in voltage in a first region a1 before and after touch input occurs in the exemplary embodiment of FIG. 1.

FIG. 4 is a graph showing a change in voltage in a first region a1 before and after touch input occurs in the exemplary embodiment of FIG. 1. FIG. 5 is a graph showing a change in voltage in a second region a2 before and after touch input occurs in the exemplary embodiment of FIG. 1.

Figure 5:
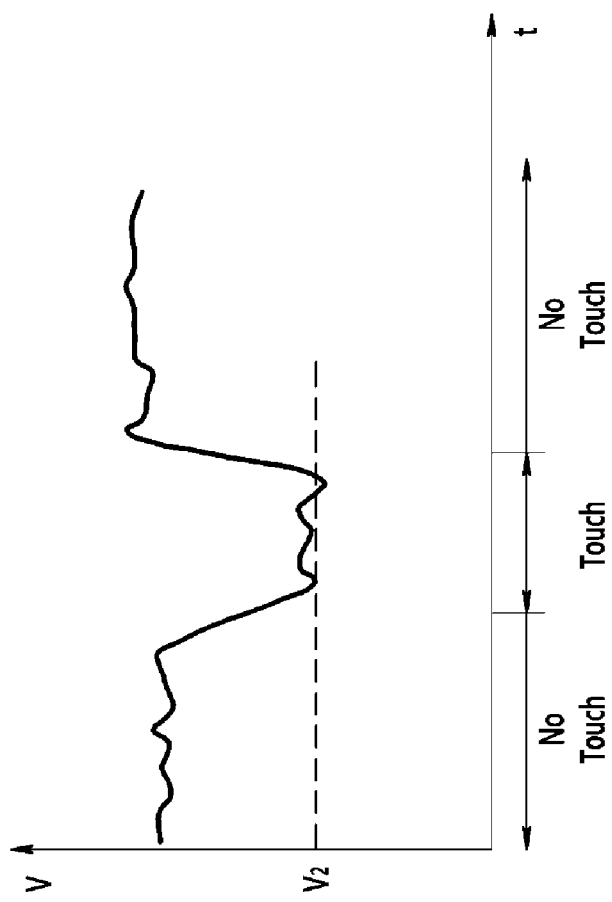
FIG. 5 is a graph showing a change in voltage in a second region a2 before and after touch input occurs in the exemplary embodiment of FIG. 1.

Referring to FIGS. 4 and 5 (which are one the same scale), because a voltage drop of the first region a1 where more capacitance is discharged is larger than voltage drop of the second region a2, the degree of voltage drop is measured to identify a touch location. The degree of voltage drop is measure by a charge amp. Method, but the touch location may be identified without being limited thereto by using, for example, a time counter method, because the time required for recharging becomes longer as the amount of voltage discharged is increased.

In a third region a3 and a fourth region a4, a fifth region a5 and a sixth region a6, and a seventh region a7 and an eighth region a8, and the like shown in FIG. 1, a touch location may be identified by the same method as described above.

Figure 6:
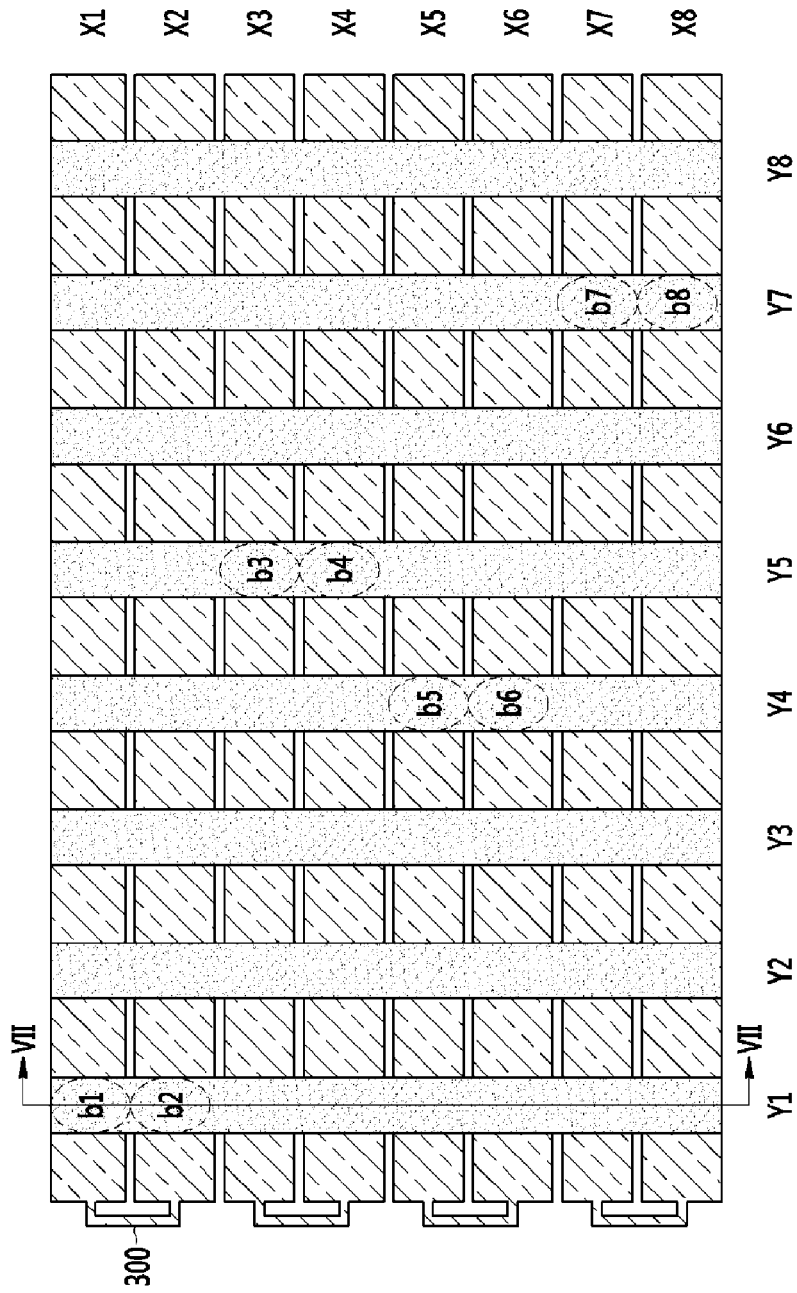
FIG. 6 is a top plan view of a touch panel according to an exemplary embodiment.
Figure 7:
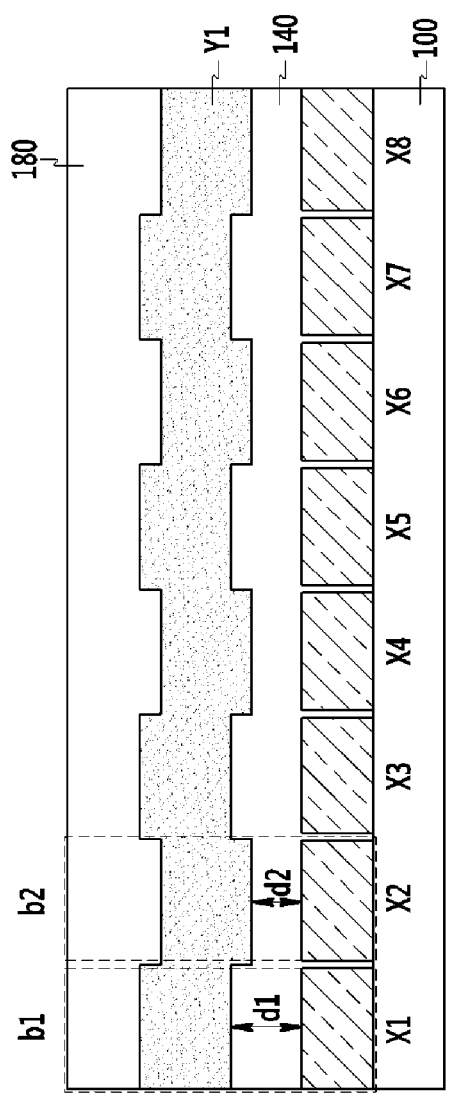
FIG. 7 is a cross-sectional view taken along line VII-VII of FIG. 6.

FIG. 6 is a top plan view of a touch panel according to an exemplary embodiment. FIG. 7 is a cross-sectional view taken along line VII-VII of FIG. 6.

Referring to FIGS. 6 and 7, a plurality of X-axis lines X1, X2, X3, X4, X5, X6, X7, and X8 extending in a horizontal direction are arranged on a substrate 100 to be spaced apart from one another. In this case, a first X-axis line X1 and a second X-axis line X2, a third X-axis line X3 and a fourth X-axis line X4, a fifth X-axis line X5 and a sixth X-axis line X6, and a seventh X-axis line X7 and an eighth X-axis line X8 selected from among the plurality of X-axis lines X1, X2, X3, X4, X5, X6, X7, and X8 are connected by a connection portion 300, respectively. The plurality of X-axis lines X1, X2, X3, X4, X5, X6, X7, and X8 may have the same width.

An insulating layer 140 is disposed on the plurality of X-axis lines X1, X2, X3, X4, X5, X6, X7, and X8. On the insulating layer 140, the plurality of Y-axis lines Y1, Y2, Y3, Y4, Y5, Y6, Y7, and Y8 cross the plurality of X-axis lines X1, X2, X3, X4, X5, X6, X7, and X8 and extend in a vertical direction. The plurality of Y-axis lines Y1, Y2, Y3, Y4, Y5, Y6, Y7, and Y8 are arranged to be spaced apart from one another. A passivation layer 180 is disposed on the plurality of Y-axis lines Y1, Y2, Y3, Y4, Y5, Y6, Y7, and Y8.

A first region b1 and a second region b2 where the first X-axis line X1 and the second X-axis line X2 connected by the connection portion 300 cross the first Y-axis line, respectively, have the same area. However, the thickness of the insulating layer 140 positioned in the first region b1 is different from the thickness of the insulating layer 140 positioned in the second region b2. In other words, the thickness of the insulating layer 140 in the first region b1 is thicker than the thickness of the insulating layer 140 in the second region b2.

Hereinafter, how to identify whether the location of a touch is in the first region b1 or the second region b2, which are actually the same node, will be described with reference to FIG. 8.

Figure 8:
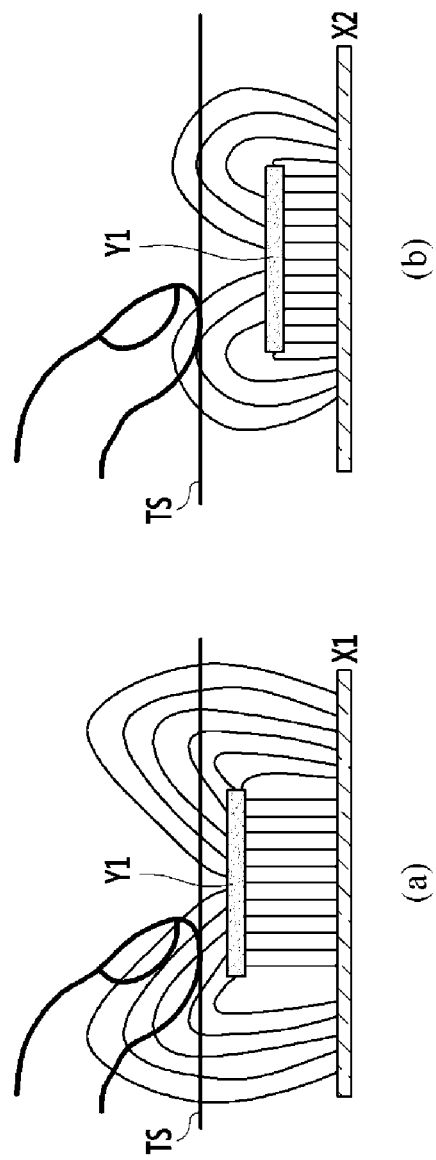
FIG. 8 is a cross-sectional view showing electric fields of a first region b1 and a second region b2 when touch input occurs in the exemplary embodiment of FIG. 7.

FIG. 8 is a cross-sectional view of the first region b1 and the second region b2 showing electric fields that are generated when touch input occurs in the exemplary embodiment of FIG. 7.

FIG. 8(A) shows an electric field in the first region b1 of FIG. 7 and FIG. 8(B) shows an electric field in the second region b2 of FIG. 7. When touch input is applied to a touch surface TS (i.e., when the touch surface TS is touched with, for instance, a fingertip) in the first region b1 of FIG. 7, a fringe field is formed between the first Y-axis line Y1 and the finger, and thus capacitance formed between the first X-axis line X1 and the first Y-axis line Y1 is discharged. Likewise, when touch input is applied to a touch surface TS in the second region b2 of FIG. 7, a fringe field is formed between the first Y-axis line Y1 and the finger, and thus capacitance formed between the second X-axis line X2 and the first Y-axis line Y1 is discharged.

In comparing FIGS. 8(A) and 8(B), the first region b1 and the second region b2 are actually the same node, but the field tends to spread farther as a distance between the X-axis line and Y-axis line is increased, and as a result, a greater fringe field is formed, and more capacitance is discharged by the finger, in the first region b1 as compared to the second region b2. Therefore, similar to FIGS. 4 and 5 described above, the degree of voltage drop may be measured to identify the location of the touch, by using a charge amp. method or by using a time counter method.

In a third region b3 and a fourth region b4, a fifth region b5 and a sixth region b6, and a seventh region b7 and an eighth region b8, and the like shown in FIG. 6, a touch location may be identified by the same method as described above.

Figure 9:
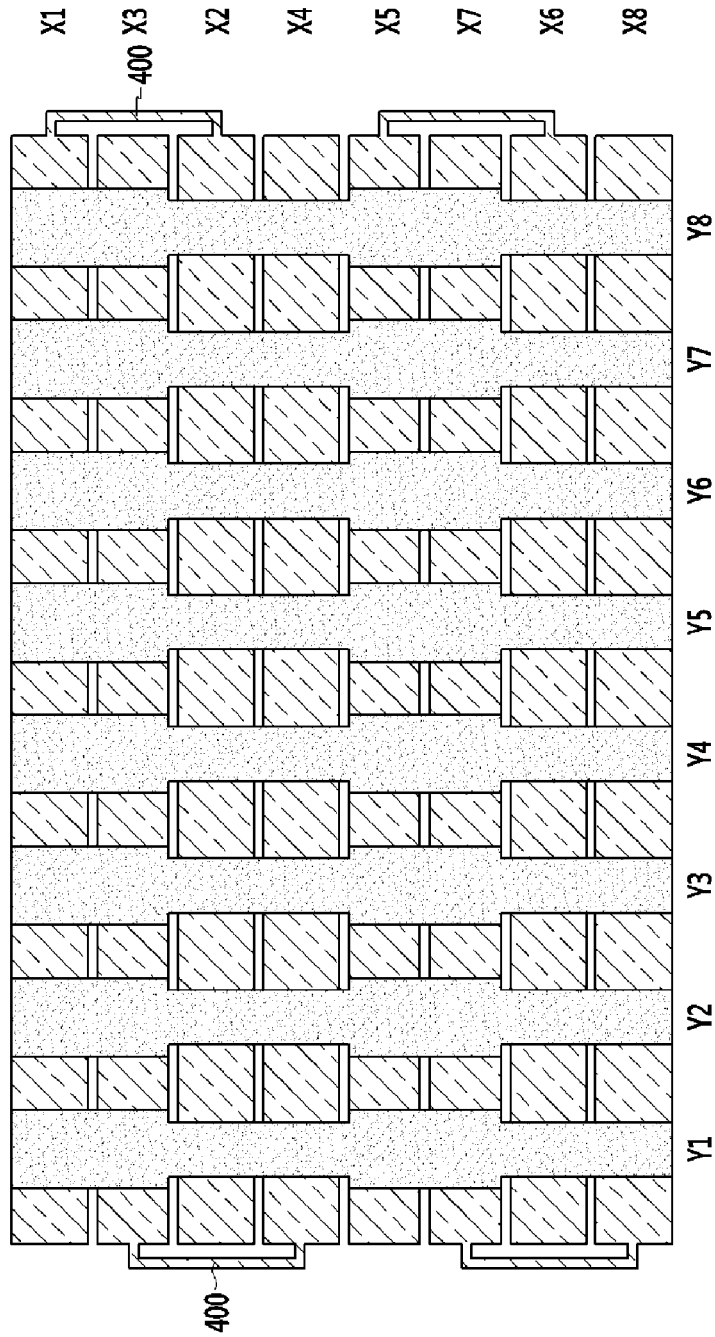
FIG. 9 is a top plan view of a touch panel according to an exemplary embodiment.

FIG. 9 is a top plan view of a touch panel according to an exemplary embodiment.

Referring to FIG. 9, the present exemplary embodiment is substantially the same as the exemplary embodiment described with reference to FIG. 1. However, a third X-axis line X3 is positioned between a first X-axis line X1 and a second X-axis line X2 connected by a connection portion 400. Likewise, when a touch panel is viewed from the top, a third X-axis line X3 and a fourth X-axis line X4 are connected by another connection portion 400 positioned on an opposite side of the touch panel from the position of the connection portion 400 connecting the first X-axis line X1 and the second X-axis line X2, and the second X-axis line X2 is positioned between the third X-axis line X3 and the fourth X-axis line X4 connected by the connection portion 400. In a similar pattern, a seventh X-axis line X7 is positioned between a fifth X-axis line X5 and a sixth X-axis line X6 connected by the connection portion 400 positioned on the same side of the touch panel as the connection portion 400 connecting the first X-axis line X1 and the second X-axis line X2 (the right side when viewed from the top of the touch panel). The sixth X-axis line X6 is positioned between the seventh X-axis line X7 and an eighth X-axis line X8 connected by the connection portion 400 positioned at the opposite side of the touch panel (the left side when viewed from the top of the touch panel).

Except for the difference described above, all the contents described in the exemplary embodiment of FIG. 1 may be applied to the present exemplary embodiment.

The present exemplary embodiment may be modified in a form where two or more X-axis lines are positioned between X-axis lines connected by the connection portions 400.

Figure 10:
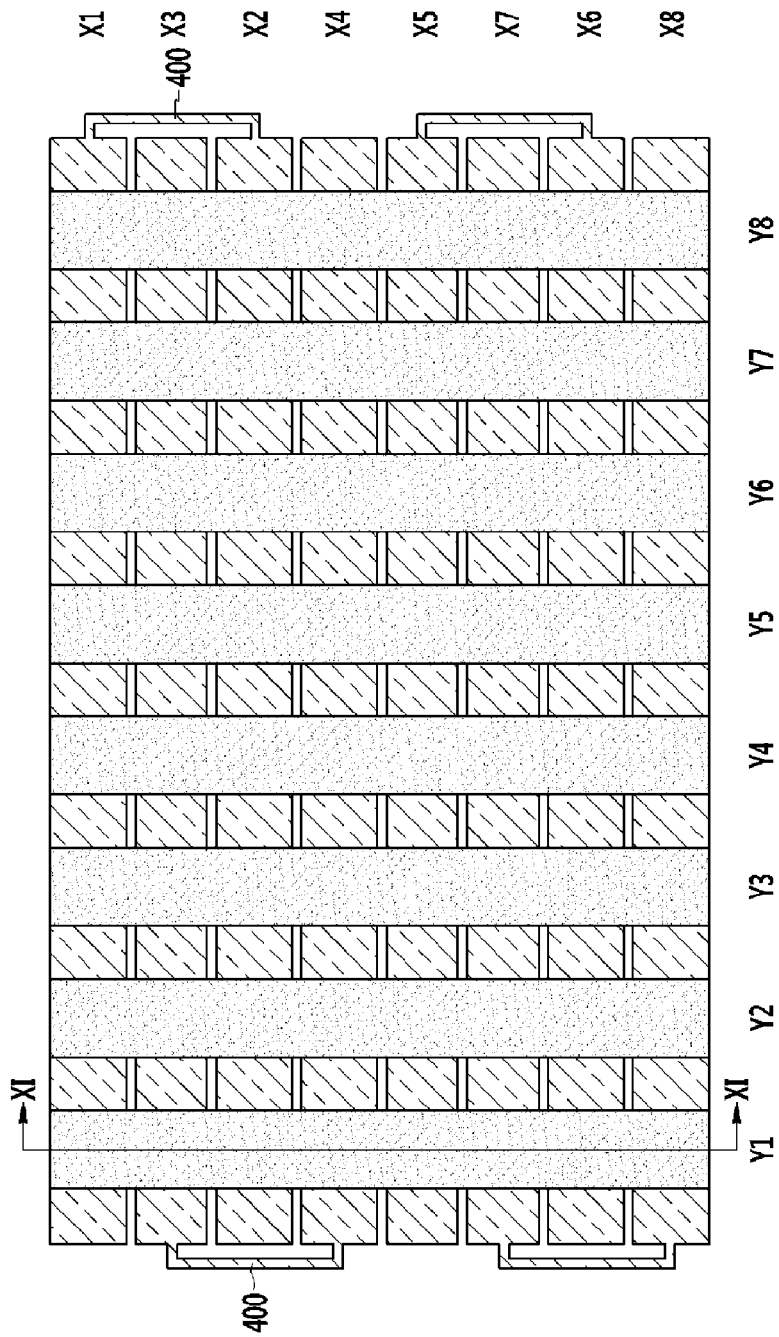
FIG. 10 is a top plan view of a touch panel according to an exemplary embodiment.
Figure 11:
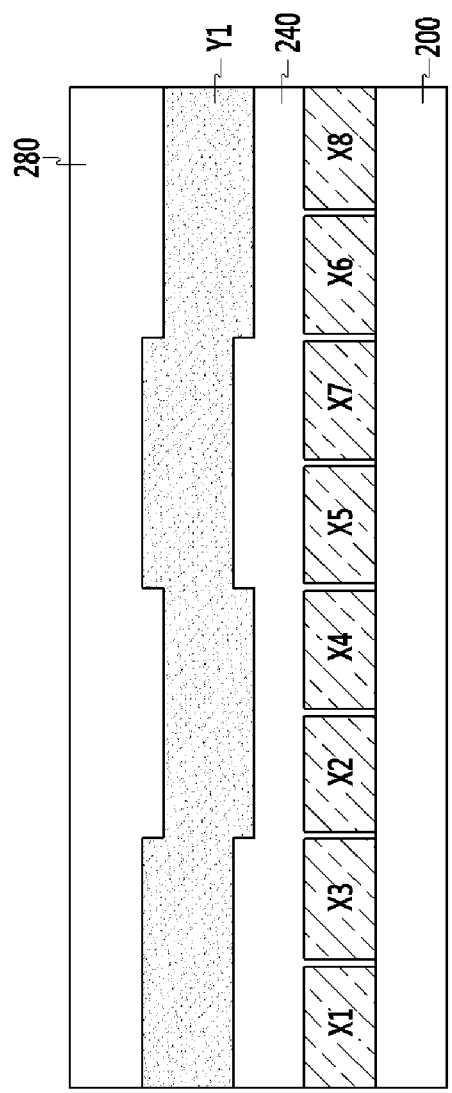
FIG. 11 is a cross-sectional view taken along line XI-XI of FIG. 10.

FIG. 10 is a top plan view of a touch panel according to an exemplary embodiment. FIG. 11 is a cross-sectional view taken along line XI-XI of FIG. 10.

Referring to FIGS. 10 and 11, the present exemplary embodiment is substantially the same as the exemplary embodiment described in FIGS. 6 and 7.

A plurality of X-axis lines X1, X2, X3, X4, X5, X6, X7, and X8 are disposed on a substrate 200, and an insulating layer 240 is disposed on the plurality of X-axis lines X1, X2, X3, X4, X5, X6, X7, and X8. On the insulating layer 240, a plurality of Y-axis lines Y1, Y2, Y3, Y4, Y5, Y6, Y7, and Y8 cross the plurality of X-axis lines X1, X2, X3, X4, X5, X6, X7, and X8 and extend in a vertical direction. The plurality of Y-axis lines Y1, Y2, Y3, Y4, Y5, Y6, Y7, and Y8 are arranged to be spaced apart from one another. A passivation layer 280 is disposed on the plurality of Y-axis lines Y1, Y2, Y3, Y4, Y5, Y6, Y7, and Y8.

A third X-axis line X3 is positioned between a first X-axis line X1 and a second X-axis line X2 connected by a connection portion 400. Likewise, the second X-axis line X2 is positioned between the third X-axis line X3 and a fourth X-axis line X4 connected by a connection portion 400, a seventh X-axis line X7 is positioned between a fifth X-axis line X5 and a sixth X-axis line X6 connected by a connection portion 400, and the sixth X-axis line X6 is disposed between the seventh X-axis line X7 and an eighth X-axis line X8 connected by a connection portion 400.

Except for the difference described above, all the contents described in the exemplary embodiment of FIGS. 6 and 7 may be applied to the present exemplary embodiment, including, as shown in FIG. 11, the thickness of the insulating layer 240 positioned over lines X1, X3 and X, X7 is different from the thickness of the insulating layer 240 positioned over lines X2, X4 and X6, X8.

The present exemplary embodiment may be modified in a form where two or more X-axis lines are positioned between X-axis lines connected by the connection portions 400.

Figure 12:
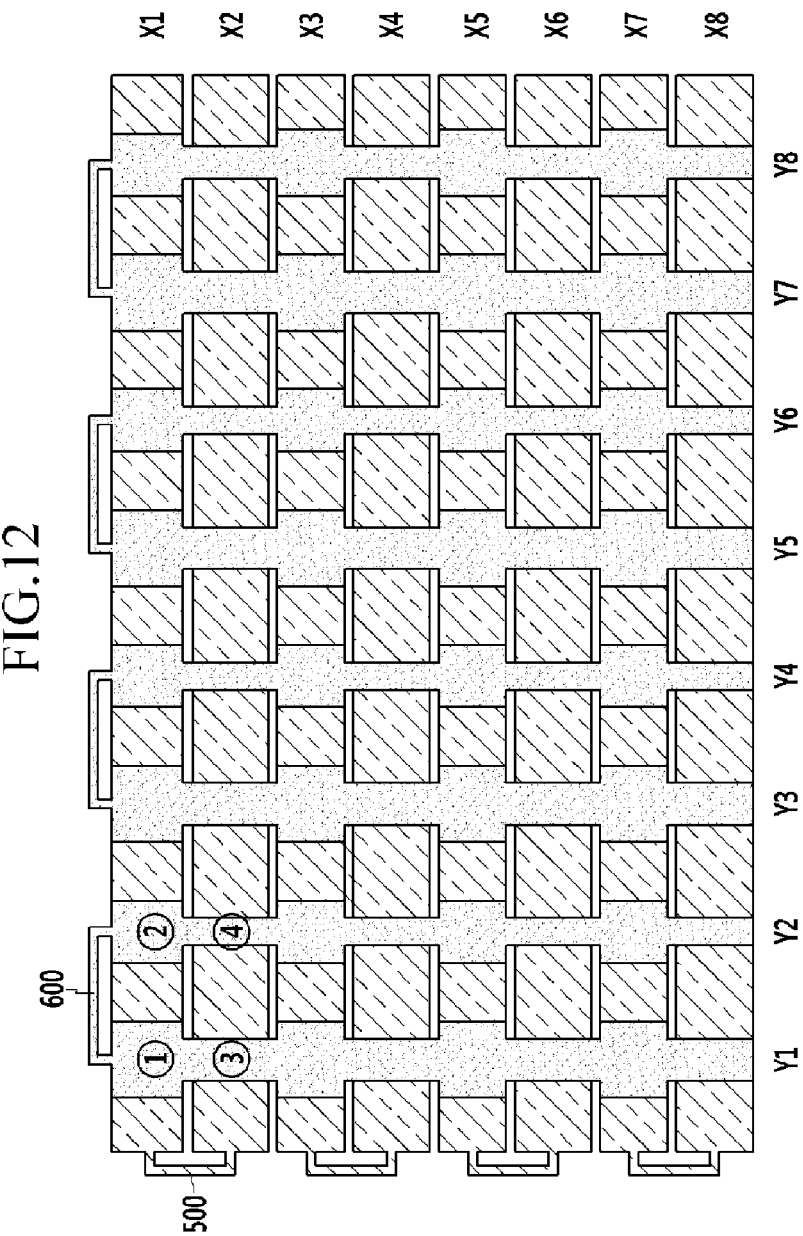
FIG. 12 is a top plan view of a touch panel according to an exemplary embodiment.

FIG. 12 is a top plan view of a touch panel according to an exemplary embodiment.

Referring to FIG. 12, the present exemplary embodiment is substantially the same as the exemplary embodiment described with reference to FIG. 1. However, a touch panel according to the present exemplary embodiment further includes a second connection portion 600 connecting Y-axis lines in addition to a first connection portion 500 connecting X-axis lines. In other words, a first Y-axis line Y1 and a second Y-axis line Y2, a third Y-axis line Y3 and a fourth Y-axis line Y4, a fifth Y-axis line Y5 and a sixth Y-axis line Y6, and a seventh Y-axis line Y7 and an eighth Y-axis line Y8 selected from among a plurality of Y-axis lines Y1, Y2, Y3, Y4, Y5, Y6, Y7, and Y8 are connected by the second connection portion 600, respectively.

An area of region ① where the first Y-axis line Y1 overlaps a first X-axis line X1, an area of region ② where the second Y-axis line Y2 overlaps the first X-axis line X1, an area of region ③ where the first Y-axis line Y1 overlaps a second X-axis line X2, and an area of region ④ where the second Y-axis line Y2 overlaps the second X-axis line X2 are different from one another. Specifically, in the present exemplary embodiment, the regions are designed in the order of the size of the area of region such that the area of region ①>the area of region ②>the area of region ③>the area of region ④. However, the ordering of the sizes of the regions is not limited thereto, and may be modified in a form where the areas of the regions are designed to be different from one another.

In the present exemplary embodiment, region ①, region ②, region ③, and region ④ are actually the same node, but differ in the capacitance that is discharged when touch input occurs due to the difference in the areas of the Y-axis lines overlapping the X-axis lines. Therefore, the location of a touch may be identified by using the difference in the capacitance, which may be measured by a charge amp. method or a time counter method using.

Except for the difference described above, all the contents described in the exemplary embodiment of FIG. 1 may be applied to the present exemplary embodiment.

Figure 13:
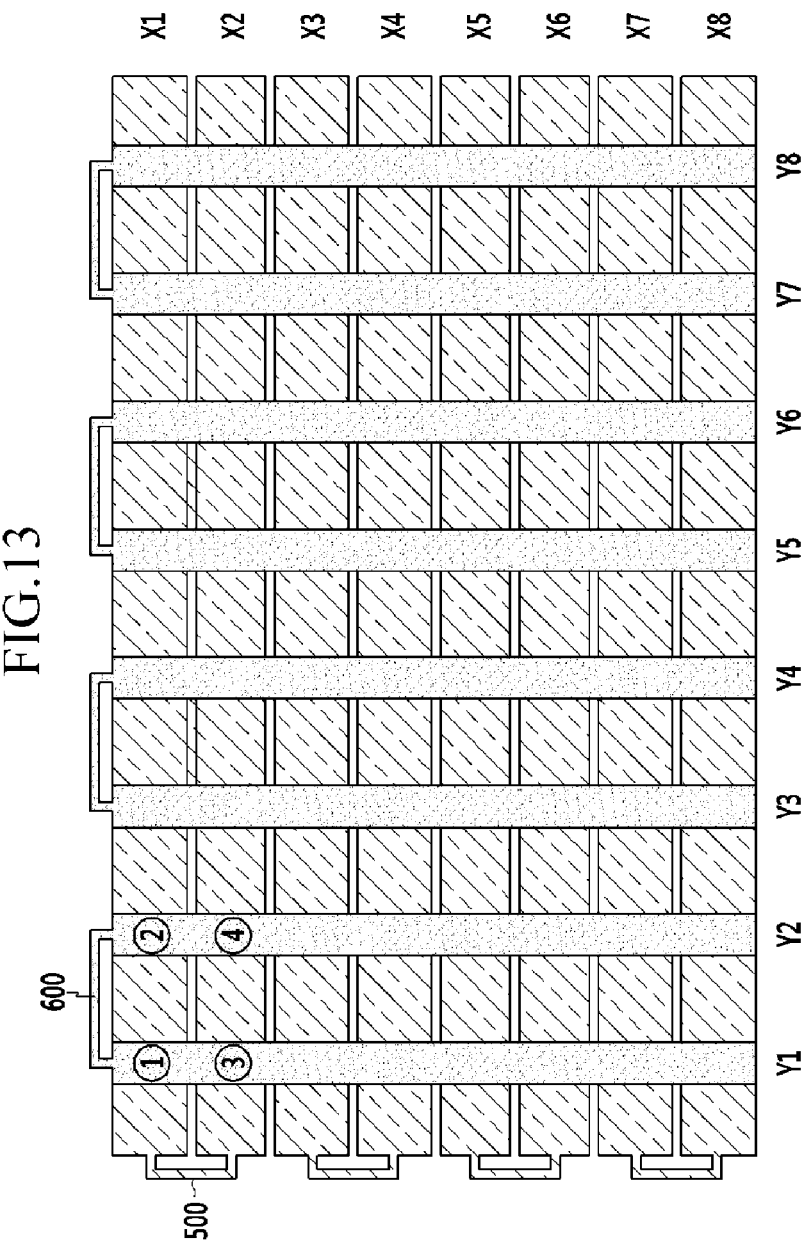
FIG. 13 is a top plan view of a touch panel according to an exemplary embodiment.

FIG. 13 is a top plan view of a touch panel according to an exemplary embodiment of the present invention Referring to FIG. 13, the present exemplary embodiment is substantially the same as the exemplary embodiment described with reference to FIGS. 6 and 7. However, a touch panel according to the present exemplary embodiment further includes a second connection portion 600 connecting Y-axis lines in addition to a first connection portion 500 connecting X-axis lines. In other words, a first Y-axis line Y1 and a second Y-axis line Y2, a third Y-axis line Y3 and a fourth Y-axis line Y4, a fifth Y-axis line Y5 and a sixth Y-axis line Y6, and a seventh Y-axis line Y7 and an eighth Y-axis line Y8 selected from among a plurality of Y-axis lines Y1, Y2, Y3, Y4, Y5, Y6, Y7, and Y8 are connected by the second connection portion 600, respectively.

Herein, the thickness of an insulating layer positioned in region ① where the first Y-axis line Y1 overlaps a first X-axis line X1, the thickness of the insulating layer positioned in region ② where the second Y-axis line Y2 overlaps the first X-axis line X1, the thickness of the insulating layer positioned in region ③ where the first Y-axis line Y1 overlaps a second X-axis line X2, and the thickness of the insulating layer positioned in region ④ where the second Y-axis line Y2 overlaps the second X-axis line X2 are different from each other. Specifically, in the present exemplary embodiment, the insulating layer is designed in the order of the thickness of the insulating layer positioned in region, such that the thickness of the insulating layer positioned in region ①>the thickness of the insulating layer positioned in region ②>the thickness of the insulating layer positioned in region ③>the thickness of the insulating layer positioned in region ④, but is not limited thereto and may be modified in a form where the thicknesses of the insulating layers positioned in the respective regions are designed to be different from one another.

In the present exemplary embodiment, region ①, region ②, region ③, and region ④ are actually the same node, but the field tends to spread farther as a distance between the X-axis line and Y-axis line is increased. As a result, the difference in the thickness of the insulating layer positioned between the X-axis lines and the Y-axis lines causes a difference in capacitance which is discharged when touch input occurs. Therefore, a touch location may be identified by using the difference in the capacitance as measured by using a charge amp. method or by using a time counter method.

Figure 14:
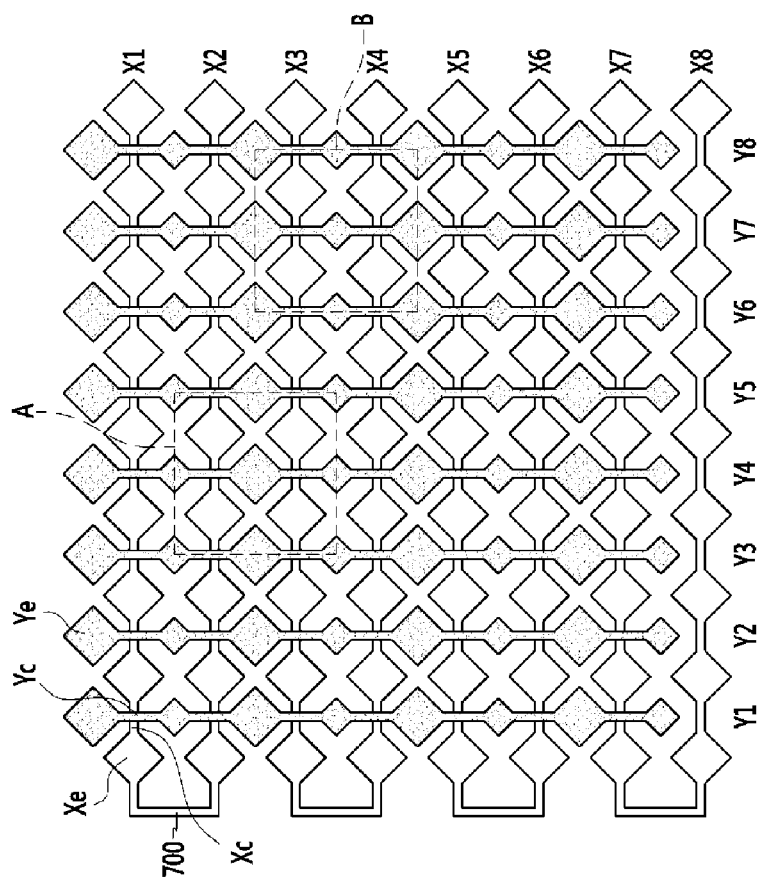
FIG. 14 is a top plan view of a touch panel according to an exemplary embodiment.
Figure 15:
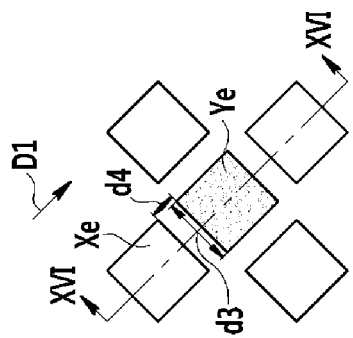
FIG. 15 is an enlarged view showing region A in the exemplary embodiment of FIG. 14.
Figure 16:
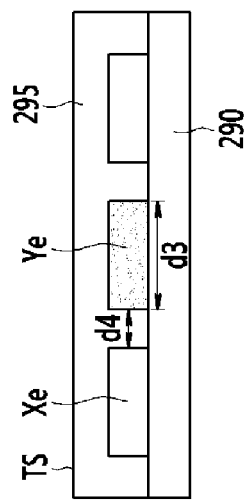
FIG. 16 is a cross-sectional view taken along line XVII-XVII of FIG. 15.
Figure 17:
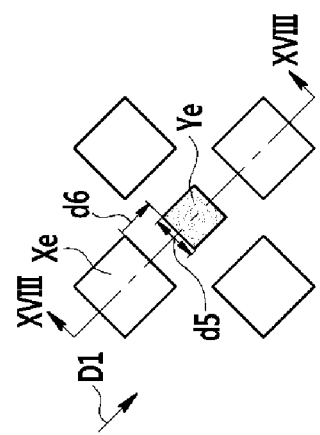
FIG. 17 is an enlarged view showing region B in the exemplary embodiment of FIG. 14.
Figure 18:
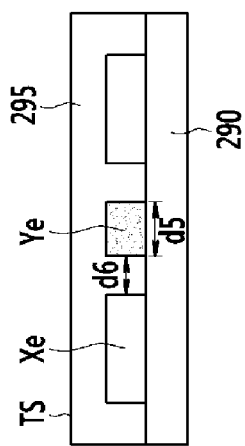
FIG. 18 is a cross-sectional view taken along line XVIII-XVIII of FIG. 17.

FIG. 14 is a top plan view of a touch panel according to an exemplary embodiment. FIG. 15 is an enlarged view showing region A in the exemplary embodiment of FIG. 14. FIG. 16 is a cross-sectional view taken along line XVII-XVII of FIG. 15. FIG. 17 is an enlarged view showing region B in the exemplary embodiment of FIG. 14. FIG. 18 is a cross-sectional view taken along line XVIII-XVIII of FIG. 17.

Referring to FIG. 14, a plurality of X-axis lines X1, X2, X3, X4, X5, X6, X7, and X8 extending in a horizontal direction are arranged on a substrate (not shown) to be spaced apart from one another. In this case, a first X-axis line X1 and a second X-axis line X2, a third X-axis line X3 and a fourth X-axis line X4, a fifth X-axis line X5 and a sixth X-axis line X6, and a seventh X-axis line X7 and an eighth X-axis line X8 selected from among the plurality of X-axis lines X1, X2, X3, X4, X5, X6, X7, and X8 are connected by a connection portion 700, respectively. Each of the plurality of X-axis lines X1, X2, X3, X4, X5, X6, X7, and X8 includes a plurality of X-axis electrode portions Xe and X-axis connection portions Xc connecting the X-axis electrode portions Xe.

A plurality of Y-axis lines Y1, Y2, Y3, Y4, Y5, Y6, Y7, and Y8 cross the plurality of X-axis lines X1, X2, X3, X4, X5, X6, X7, and X8 and extend in a vertical direction. The plurality of Y-axis lines Y1, Y2, Y3, Y4, Y5, Y6, Y7, and Y8 are arranged to be spaced apart from one another. Each of the plurality of Y-axis lines Y1, Y2, Y3, Y4, Y5, Y6, Y7, and Y8 includes a plurality of Y-axis electrode portions Ye and Y-axis connection portions Yc connecting the Y-axis electrode portions Ye.

In the present exemplary embodiment, the plurality of X-axis lines X1, X2, X3, X4, X5, X6, X7, and X8 and the plurality of Y-axis lines Y1, Y2, Y3, Y4, Y5, Y6, Y7, and Y8 are arranged at a same plane.

The X-axis connection portions Xc and the Y-axis connection portions Yc are positioned at portions where the X-axis lines and the Y-axis lines cross. In the present exemplary embodiment, the X-axis lines and the Y-axis lines are positioned on the same plane and thus should not short-circuit together. Accordingly, the X-axis connection portion Xc is cut at a point crossing the Y-axis connection portion Yc, and two adjacent X-axis electrode portions Xe are connected by a connection bridge (not shown). Specifically, an insulating layer (not shown) having contact holes (not shown) is positioned on the X-axis connection portions Xc and the Y-axis connection portions Yc, and the connection bridges are positioned on the insulating layer. The connection bridge and the X-axis connection portion Xc are connected through the contact hole, such that the X-axis connection portion Xc may connect two adjacent X-axis electrode portions Xe while being insulated from the Y-axis connection portion Yc.

Alternatively, the Y-axis connection portions Yc may be connected by connection bridges instead of the X-axis connection portions Xc.

The X-axis connection portion Xc and the Y-axis connection portion Yc may have various pattern shapes such as a rectangle and a diamond.

Referring to FIGS. 15 and 16, one Y-axis electrode portion Ye and one X-axis electrode portion Xe, which are positioned in region A on a substrate 290, are positioned adjacent to each other in a first direction D1. An insulating layer 295 is positioned on the X-axis electrode portion Xe and the Y-axis electrode portion Ye. Capacitance which is discharged when touch input occurs varies according to an area (d3*d4) of a space between the X-axis electrode portion Xe and the Y-axis electrode portion Ye wherein the X-axis electrode portion Xe faces the Y-axis electrode portion Ye.

Referring to FIGS. 17 and 18, one Y-axis electrode portion Ye and one X-axis electrode portion Xe, which are positioned in region B on the substrate 290, are positioned adjacent to each other in a first direction D1. An insulating layer 295 is positioned on the X-axis electrode portions Xe and the Y-axis electrode portions Ye. Herein, an area (d5*d6) of a space between the X-axis electrode portion Xe and the Y-axis electrode portion Ye where the X-axis electrode portion Xe faces the Y-axis electrode portion Ye is smaller as compared to region A of FIG. 14. Therefore, in comparing region A and region B, because the area of the space between the X-axis electrode portion Xe and the Y-axis electrode portion Ye facing each other is larger in the region A as compared to region B, more capacitance is discharged in region A when touch input occurs.

According to the present exemplary embodiment, a first X-axis electrode portion and a second X-axis electrode portion, which are included in each of two X-axis lines connected by the connection portion 700, are positioned in a Y-axis line direction, and a first Y-axis electrode portion and a second Y-axis electrode portion, which are included in a single Y-axis line, are positioned adjacent to the first X-axis electrode portion and the second X-axis electrode portion in the first direction D1, respectively. An area of a space between the first X-axis electrode portion and the first Y-axis electrode portion is different from an area of a space between the second X-axis electrode portion and the second Y-axis electrode portion.

As a result, because the X-axis lines are connected by the connection portion 700, the difference in the area of the space between two electrode portions in the regions that are actually the same node causes a difference in capacitance which is discharged when touch input occurs. Therefore, a touch location may be identified by using the difference in the capacitance measured by using a charge amp. method or by using a time counter method.

The touch panel according to the present exemplary embodiment described above may be widely applied to touch type display devices such as a liquid crystal display and an organic light emitting device.

In the case where the touch panel according to the present exemplary embodiment described above is applied to a liquid crystal display, the substrate 100 may be an upper panel of the liquid crystal display. The liquid crystal display has a structure including a lower panel, an upper panel, and a liquid crystal layer interposed therebetween, the lower panel includes a thin film transistor, a pixel electrode, and the like, and the upper panel includes a color filter, a light blocking member, a common electrode, and the like. Accordingly, the touch panel according to the present exemplary embodiment may correspond to the upper panel of the liquid crystal display and the touch panel according to the present exemplary embodiment may include a common electrode, a color filter, a light blocking member, and the like. However, because the liquid crystal display may be manufactured by various methods, at least one of a color filter, a light blocking member, and a common electrode may be included in the lower panel.

The case where the touch panel according to the aforementioned exemplary embodiment is applied to a liquid crystal display will be described with reference to FIG. 19.

FIG. 19 shows a liquid crystal display including a touch panel according to an exemplary embodiment.

Referring to FIG. 19, the liquid crystal display includes a lower panel 1000 corresponding to a thin film transistor array panel including a thin film transistor (TFT), an upper panel 2000 facing the lower panel 1000 and corresponding to a color filter display panel including a plurality of color filters 2300 on a surface facing the lower panel 1000, and a liquid crystal layer 3 formed between the lower panel 1000 and the upper panel 2000. The liquid crystal layer 3 includes liquid crystal molecules (not shown).

The lower panel 1000 includes a first insulation substrate 1100, a thin film transistor (TFT) disposed on the first insulation substrate 1100, an insulating layer 1800 formed on a top surface of the thin film transistor (TFT), and a pixel electrode 1910 disposed on the insulating layer 1800. The thin film transistor (TFT) may include a gate electrode 1240, a gate insulating layer 1400 covering the gate electrode 1240, a semiconductor layer 1540, ohmic contact layers 1630 and 1650, a source electrode 1730, and a drain electrode 1750.

On the insulating layer 1800, a contact hole 1850 is formed to expose the drain electrode 1750 of the thin film transistor (TFT).

The upper panel 2000 includes light blocking members 2200 disposed on one surface of a second insulation substrate 2100 and arranged in a matrix form, color filters 2300 disposed on the second insulation substrate 2100, and a common electrode 2700 disposed on the color filters 2300 and applying voltage to the liquid crystal layer 3 to correspond to the pixel electrode 1910 of the lower panel 1000.

In the present exemplary embodiment, sensing electrodes X, an insulating layer 1400, driving electrodes Y, and a passivation layer 1800 are disposed on the other surface of the second insulation substrate 2100, opposite the suface facing the liquid crystal layer 3. As described above, in the present exemplary embodiment, when the upper panel 2000 of the liquid crystal display is formed, the sensing electrodes X, the insulating layer 1400, the driving electrodes Y, and the like as constituent element of a touch screen may be formed together.

A touch panel of the above-described type is referred to as an on cell type touch panel, as the touch panel is disposed on the top surface of the display cell. As another exemplary embodiment of the present invention to be described below, the touch panel described above may also be applied as an in cell type touch panel.

The in cell type touch panel may include a light blocking member, a color filter, a common electrode, and the like as constituent elements of an upper panel of a liquid crystal display together with a sensing electrode, an insulating layer, and a driving electrode all on the same surface of the insulation substrate. Herein, the driving electrode may be separately formed, but a common electrode, which is patterned, may be used as a driving electrode.

According to the exemplary embodiments, it is possible to reduce the number of lead wires positioned on a bezel by commonly connecting the X-axis lines or the Y-axis lines through the connection portions, thereby reducing the size of the bezel.

While embodiments have has described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure including the appended claims.

| <Description of symbols> | | | |
|---|---|---|---|
| 100 | Substrate | 140 | Insulating layer |
| 180 | Passivation layer | | |
| 300, 400, 500, 600, 700 | Connection portion | | |

What is claimed is:

1. A touch panel, comprising:
a substrate;
a plurality of X-axis lines disposed on the substrate;
a plurality of Y-axis lines crossing the plurality of X-axis lines; and
an insulating layer interposed between the X-axis lines and the Y-axis lines,
wherein at least one first X-axis line selected from among the plurality of X-axis lines overlaps a first Y-axis line selected from among the plurality of Y-axis lines at a first region and at least one second X-axis line selected from among the remaining plurality of X-axis lines extends substantially parallel to the first X-axis line and overlaps the first Y-axis line at a second region having a position different from the first region, the first X-axis line and the second X-axis line are connected by a first connection portion,
a first portion of the first Y-axis line overlapping the first X-axis line at the first region has a first area and a second portion of the first Y-axis line overlapping the second X-axis line at the second region has a second area, and
the first area and the second area are different from each other.

2. The touch panel of claim 1, wherein:
the first Y-axis line and at least one second Y-axis line selected from among the plurality of remaining Y-axis lines are connected by a second connection portion,
among the plurality of X-axis lines, an X-axis line crossing the first Y-axis line and the second Y-axis line has a third area in a region where the X-axis line overlaps the first Y-axis line and a fourth area in a region where the X-axis line overlaps the second Y-axis line, and
the third area and the fourth area are different from each other.

3. The touch panel of claim 2, wherein:
the first area, the second area, the third area, and the fourth area are different from one another.

4. The touch panel of claim 1, wherein:
the plurality of X-axis lines includes
a third X-axis line disposed between the first X-axis line and the second X-axis line and
a fourth X-axis line with the second X-axis line disposed between the third X-axis line and the fourth X-axis line, and
the third X-axis line and the fourth X-axis line are connected by a third connection portion.

5. The touch panel of claim 4, wherein:
the first connection portion and the third connection portion are positioned at left and right sides, respectively, of the touch panel when the touch panel is viewed from a top plan view.

6. The touch panel of claim 1, wherein:
the X-axis line is a sensing electrode and the Y-axis line is a driving electrode.

7. The touch panel of claim 1, wherein:
the first X-axis line and the second X-axis line have a same width and extend in a same direction.

8. The touch panel of claim 1, wherein:
the plurality of X-axis lines, the insulating layer, and the plurality of Y-axis lines are sequentially laminated, and
the touch panel further includes a passivation layer disposed on the plurality of Y-axis lines.

9. The touch panel of claim 1, further comprising:
a color filter disposed on the substrate,
wherein the color filter, the plurality of X-axis lines, and the plurality of Y-axis lines are disposed at a same plane as the substrate.

10. The touch panel of claim 1, wherein:
the plurality of X-axis lines comprise a transparent conductive material.

11. The touch panel of claim 1, wherein:
the plurality of Y-axis lines comprise a transparent conductive material.

12. A touch panel, comprising:
a substrate;
a plurality of X-axis lines disposed on the substrate;
a plurality of Y-axis lines crossing the plurality of X-axis lines; and
an insulating layer interposed between the X-axis lines and the Y-axis lines,
wherein at least one first X-axis line selected from among the plurality of X-axis lines crosses a first Y-axis line selected from among the plurality of Y-axis lines at a first position and at least one second X-axis line selected from among the plurality of X-axis lines extends substantially parallel to the first X-axis line and crosses the first Y-axis line at a second position different from the first position, the first X-axis line and the second X-axis line are connected by a first connection portion, and
the insulating layer has a first thickness at the first position and a second thickness at the second position, and
the first thickness and the second thickness are different from each other.

13. The touch panel of claim 12, wherein:
the first Y-axis line and at least one second Y-axis line selected from among the plurality of Y-axis lines are connected by a second connection portion,
the plurality of X-axis lines include a crossing X-axis line crossing the first Y-axis line and the second Y-axis line,
the insulating layer has a third region having a third thickness in a region where the first Y-axis line overlaps the crossing X-axis line and a fourth region having a fourth thickness in a region where the second Y-axis line overlaps the crossing X-axis line, and
the third thickness and the fourth thickness are different from each other.

14. The touch panel of claim 13, wherein:
the first thickness, the second thickness, the third thickness, and the fourth thickness are different from one another.

15. The touch panel of claim 12, wherein:
the plurality of X-axis lines include
a third X-axis line disposed between the first X-axis line and the second X-axis line and
a fourth X-axis line with the second X-axis line disposed between the third X-axis line and the fourth X-axis line, and
the third X-axis line and the fourth X-axis line are connected by a third connection portion.

16. The touch panel of claim 15, wherein:
the first connection portion and the third connection portion are positioned at left and right sides, respectively, of the touch panel when the touch panel is viewed from a top plan view.

17. The touch panel of claim 12, wherein:
the X-axis line is a sensing electrode and the Y-axis line is a driving electrode.

18. The touch panel of claim 12, wherein:
the first X-axis line and the second X-axis line have a same width and extend in a same direction.

19. The touch panel of claim 12, wherein:
the plurality of X-axis lines, the insulating layer, and the plurality of Y-axis lines are sequentially laminated, and
the touch panel further includes a passivation layer disposed on the plurality of Y-axis lines.

20. A touch panel, comprising:
a substrate;
a plurality of X-axis lines disposed on the substrate;
a plurality of Y-axis lines crossing the plurality of X-axis lines; and
a first connection portion connecting at least one first X-axis line selected from among the plurality of X-axis lines and at least one second X-axis line selected from among the remaining plurality of X-axis lines,
wherein the second X-axis line extends substantially parallel to and is spaced apart from the first X-axis line,
wherein the X-axis line comprises a plurality of X-axis electrode portions and the Y-axis line comprises a plurality of Y-axis electrode portions,
among the plurality of Y-axis lines, a Y-axis line crossing the first X-axis line and the second X-axis line comprises a first Y-axis electrode portion adjacent to a first X-axis electrode portion of the first X-axis line in a first direction and a second Y-axis electrode portion adjacent to a second X-axis electrode portion of the second X-axis line in the first direction, and
an area of a space between the first X-axis electrode portion and the first Y-axis electrode portion is different from an area of a space between the second X-axis electrode portion and the second Y-axis electrode portion.

21. The touch panel of claim 20, further comprising:
a second connection portion connecting at least one first Y-axis line and at least one second Y-axis line selected from among the plurality of Y-axis lines,
wherein among the plurality of X-axis lines, an X-axis line crossing the first Y-axis line and the second Y-axis line includes a third X-axis electrode portion adjacent to a third Y-axis electrode portion of the first Y-axis line in a second direction and a fourth X-axis electrode portion adjacent to a fourth Y-axis electrode portion of the second Y-axis line in the second direction, and
an area of a space between the third X-axis electrode portion and the third Y-axis electrode portion is different from an area of a space between the fourth X-axis electrode portion and the fourth Y-axis electrode portion.

22. The touch panel of claim 20, wherein:
the plurality of X-axis lines comprise
a third X-axis line disposed between the first X-axis line and the second X-axis line and
a fourth X-axis line with the second X-axis line disposed between the third X-axis line and the fourth X-axis line, and
the third X-axis line and the fourth X-axis line are connected by a third connection portion.

23. The touch panel of claim 22, wherein:
at least one Y-axis line selected from among the plurality of Y-axis lines is disposed between the first Y-axis line and the second Y-axis line.

24. The touch panel of claim 20, wherein:
the plurality of X-axis lines and the plurality of Y-axis lines are arranged at a same plane.

25. The touch panel of claim 20, wherein:
a shape of each X-axis electrode portion of the plurality of X-axis electrode portions and each Y-axis electrode portion of the plurality of Y-axis electrode portions is a rhombus.

26. The touch panel of claim 20, further comprising:
a passivation layer disposed on the plurality of X-axis lines and the plurality of Y-axis lines.

* * * * *